US009723015B2

(12) United States Patent
Klein

(10) Patent No.: US 9,723,015 B2
(45) Date of Patent: *Aug. 1, 2017

(54) DETECTING MALWARE-RELATED ACTIVITY ON A COMPUTER

(71) Applicant: INTERNATIONAL BUSINESS MACHINES CORPORATION, Armonk, NY (US)

(72) Inventor: Amit Klein, Herzliya (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/951,530

(22) Filed: Nov. 25, 2015

(65) Prior Publication Data

US 2016/0088003 A1    Mar. 24, 2016

Related U.S. Application Data

(63) Continuation of application No. 14/230,282, filed on Mar. 31, 2014.

(51) Int. Cl.
*H04L 29/06* (2006.01)
*G06F 21/56* (2013.01)

(52) U.S. Cl.
CPC ........ *H04L 63/1416* (2013.01); *G06F 21/566* (2013.01); *H04L 63/145* (2013.01)

(58) Field of Classification Search
CPC .. H04L 63/1416; H04L 63/145; G06F 21/566
See application file for complete search history.

(56) References Cited

U.S. PATENT DOCUMENTS

| 7,712,132 B1* | 5/2010 | Ogilvie | H04L 63/1408 726/22 |
| 8,056,134 B1* | 11/2011 | Ogilvie | G06F 21/566 713/187 |
| 8,250,651 B2* | 8/2012 | Huang | G06F 17/30864 726/22 |

(Continued)

OTHER PUBLICATIONS

List_of_Related_IBM_Applications, Nov. 25, 2015.

*Primary Examiner* — Harunur Rashid
*Assistant Examiner* — Cheng-Feng Huang
(74) *Attorney, Agent, or Firm* — Daniel J. Swirsky; AlphaPatent Associates Ltd.

(57) ABSTRACT

Detecting malware-related activity on a computer by detecting activity associated with the creation of a data object, where the activity is performed by a process, where the process is an instance of a computer software application that resides in a computer memory and that is executed by a computer, and where the data object is configured to persist after termination of the process, determining a string that identifies the data object, searching for a portion of the string that identifies the data object within any areas of the computer memory storing static portions of the computer software application, and performing a computer-security-related remediation action responsive to determining that the portion of the string that identifies the data object is absent from the searched areas of the computer memory.

9 Claims, 3 Drawing Sheets

(56) References Cited

U.S. PATENT DOCUMENTS

| | | | | |
|---|---|---|---|---|
| 8,468,244 B2* | 6/2013 | Redlich | G06Q 10/06 | 705/50 |
| 8,555,386 B1* | 10/2013 | Belov | G06F 21/566 | 726/22 |
| 8,561,188 B1* | 10/2013 | Wang | H04L 63/1425 | 713/176 |
| 8,578,496 B1* | 11/2013 | Krishnappa | H04L 63/123 | 713/187 |
| 2007/0240221 A1* | 10/2007 | Tuvell | G06F 21/56 | 726/24 |
| 2008/0140912 A1 | 6/2008 | Pandya | | |
| 2008/0177994 A1* | 7/2008 | Mayer | G06F 9/4418 | 713/2 |
| 2008/0256634 A1* | 10/2008 | Pichler | H04L 63/145 | 726/23 |
| 2009/0077664 A1* | 3/2009 | Hsu | G06F 21/566 | 726/24 |
| 2009/0323383 A1* | 12/2009 | Mondaeev | G11C 15/00 | 365/49.17 |
| 2013/0227636 A1* | 8/2013 | Bettini | H04W 4/001 | 726/1 |
| 2013/0247190 A1* | 9/2013 | Spurlock | H04L 63/1425 | 726/23 |
| 2013/0340080 A1* | 12/2013 | Gostev | H04L 63/145 | 726/24 |
| 2013/0347094 A1* | 12/2013 | Bettini | H04L 63/0245 | 726/11 |
| 2014/0075567 A1* | 3/2014 | Raleigh | H04W 12/10 | 726/26 |
| 2014/0123280 A1* | 5/2014 | Kedma | G06F 21/56 | 726/23 |
| 2014/0130161 A1* | 5/2014 | Golovanov | G06F 21/564 | 726/23 |
| 2014/0143869 A1* | 5/2014 | Pereira | G06F 21/566 | 726/23 |
| 2014/0258490 A1* | 9/2014 | Kim | H04L 67/327 | 709/223 |
| 2015/0220735 A1* | 8/2015 | Paithane | G06F 21/566 | 726/23 |

* cited by examiner

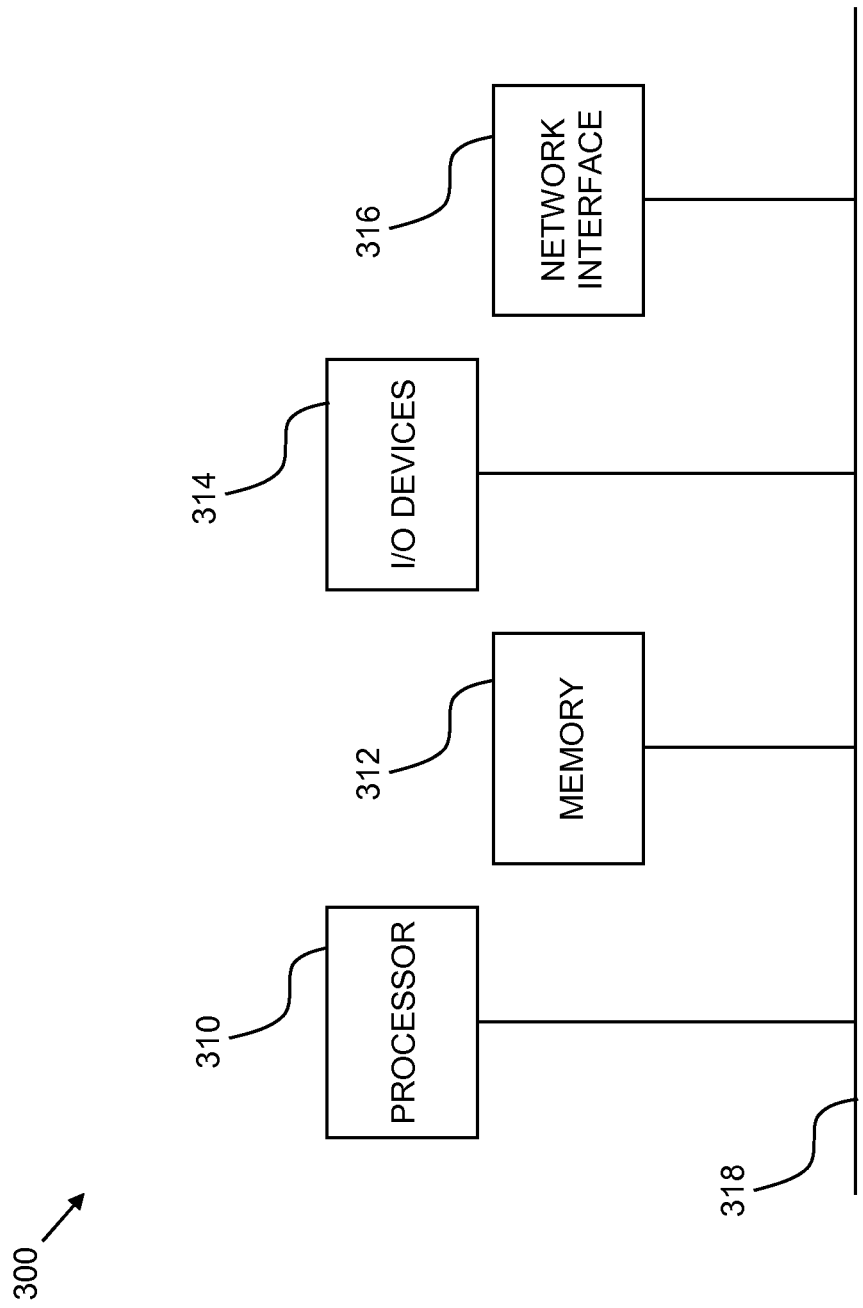

DETECTING MALWARE-RELATED ACTIVITY ON A COMPUTER

FIELD

The present invention relates generally to computer system security, and more particularly, to the detection of malware-related activity on a computer system.

BACKGROUND

Malware is software used to disrupt computer operation, gather sensitive information, or gain access to private computer systems. It can appear in the form of code, scripts, active content, and other software. Malware includes computer viruses, worms, trojan horses, rootkits, key loggers, dialers, spyware, adware, and other malicious programs. Software such as anti-virus, anti-malware, and firewalls are relied upon by users to safeguard against malware attacks. Anti-virus, anti-malware, and firewalls also help to identify and prevent the further spread of malware in a computer system.

SUMMARY

In one aspect of the invention a method is provided for detecting malware-related activity on a computer, the method including detecting activity associated with the creation of a data object, where the activity is performed by a process, where the process is an instance of a computer software application that resides in a computer memory and that is executed by a computer, and where the data object is configured to persist after termination of the process, determining a string that identifies the data object, searching for a portion of the string that identifies the data object within any areas of the computer memory storing static portions of the computer software application, and performing a computer-security-related remediation action responsive to determining that the portion of the string that identifies the data object is absent from the searched areas of the computer memory.

In other aspects of the invention systems and computer program products embodying the invention are provided.

BRIEF DESCRIPTION OF THE DRAWINGS

FIG. 3 is a simplified block diagram illustration of an exemplary hardware implementation of a computing system, constructed and operative in accordance with an embodiment of the invention.

DETAILED DESCRIPTION

Figure 1:
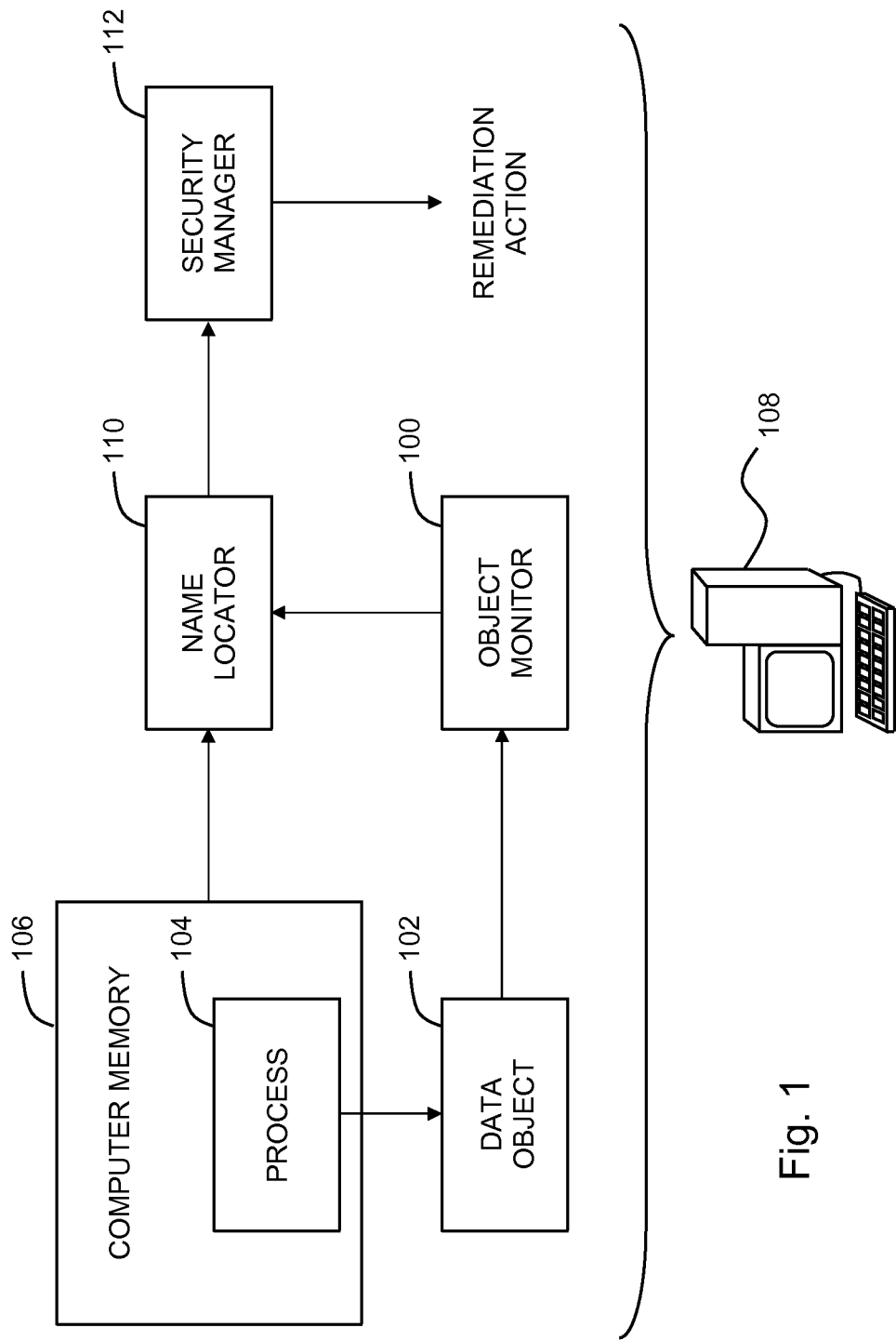
FIG. 1 is a simplified conceptual illustration of a system for detecting malware-related activity on a computer, constructed and operative in accordance with an embodiment of the invention.

Early solutions for detecting the presence of malware on computers relied upon detecting known invariant characteristics of malware. For example, one type of malware involved the installation of a file named "1sass.exe" on a target computer, mimicking the legitimate Microsoft Windows™ operating system file "lsass.exe," where the malware file name contained the digit "1" instead of the letter "l". In this instance, detecting the presence of this malware involved simply detecting the presence of a file named "1sass.exe" (containing the digit "1"). However, present-day malware take care to randomize the names of files, registry keys, and other data objects they create, where different names are used each time such malware are run, making such malware more difficult to detect.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a simplified conceptual illustration of a system for detecting malware-related activity on a computer, constructed and operative in accordance with an embodiment of the invention. When a process that is executed by a computer generates a random string, such as when malware creates a file with a randomly-generated name, this string typically resides either on the process stack or on the process heap. More importantly, this string will typically not reside in those areas of computer memory into which are loaded the instructions and data that comprise the static portion of the computer software application that is instantiated as the process. Conversely, when a process creates a file with a "hard-wired" name that is not randomly generated, the name will typically be found among the static instructions and data that comprise the process. Thus, by monitoring the creation of data objects created by a process and searching for the names of such objects among the static instructions and data that comprise the process, if the names are not found among the static instructions and data that comprise the process, the process may very well be malware.

In the system of FIG. 1 an object monitor 100 is configured to detect activity associated with the creation of a data object 102 by a process 104, where process 104 is an instance of a computer software application that resides in a computer memory 106 of a computer 108 and that is executed by computer 108. Data object 102 is preferably configured to persist after termination of process 104 and may, for example, be a file, a folder, a registry key. Object monitor 100 is preferably configured to detect an attempt by process 104 to create data object 102, i.e., before data object 102 is created. Additionally or alternatively, object monitor 100 is configured to detect activity associated with the creation of data object 102 by a process 104 by detecting data object 102 after data object 102 is created.

The system of FIG. 1 also includes a name locator 110 configured to determine a string that identifies data object 102, such as the name of data object 102, and search computer memory 106 for a portion of a string, such as part or all of the string. Name locator 110 preferably searches for the string portion only within those areas of computer memory 106 in which are stored, either encrypted or decrypted, any instructions and/or data that together comprise the static portion of the computer software application that is instantiated as process 104. Thus, name locator 110 preferably does not search for the string portion within areas of computer memory 106 in which are stored data that are generated by process 104 and that represent the work product of process 104, such as may be found in the areas of computer memory 106 commonly referred to as the process heap and the process stack. However, as some areas of the process heap or the process stack may be used to store instructions and/or data from the static portion of the computer software application that is instantiated as process 104, and particularly decrypted versions of such instructions and/or data that are encrypted, any such areas are preferably included in the search by name locator 110 for the string portion. Name locator 110 preferably searches for multiple encodings of the string portion, such by searching for both ASCII and Unicode versions of the string portion.

The system of FIG. 1 also includes a security manager 112 configured to perform one or more predefined computer-security-related remediation actions in response to it being determined that the portion of the string that identifies data object 102 is absent from those areas of computer memory 106 in which are stored any instructions and/or data that together comprise the static portion of the computer software application that is instantiated as process 104. The remediation actions may include any of preventing the creation of data object 102 if data object 102 has not yet been created, deleting data object 102 or placing data object 102 in quarantine after data object 102 has been created, and providing a computer-security-related notification reporting the activity, such as to a user or administrator of computer 108.

Any of the elements shown in FIG. 1 are preferably implemented by one or more computers, such as by computer 108, in computer hardware and/or in computer software embodied in a non-transitory, computer-readable medium in accordance with conventional techniques.

Figure 2:
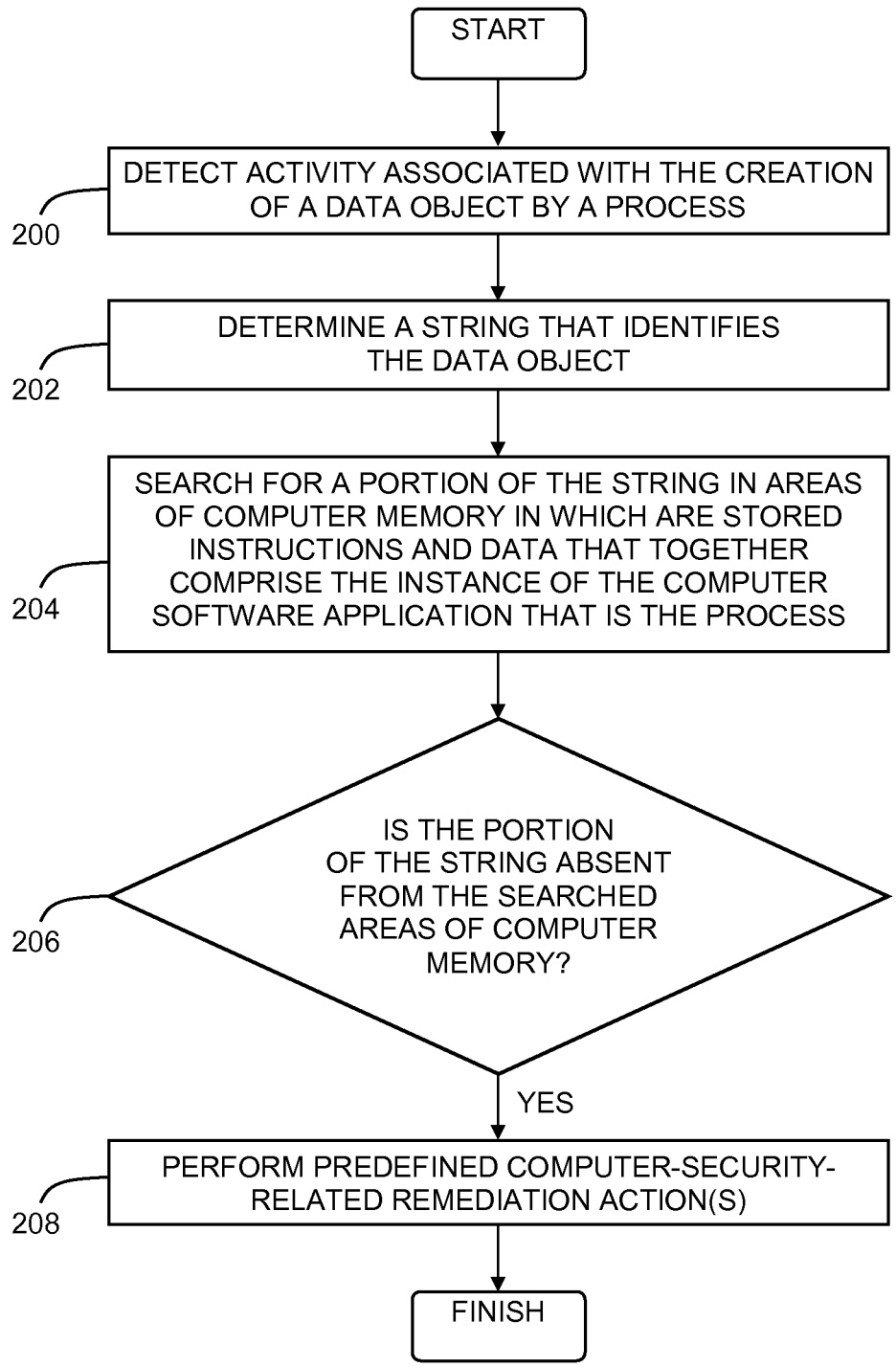
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, activity associated with the creation of a data object by a process is detected (step 200), where the data object is preferably configured to persist after termination of the process. A string that identifies the data object is determined (step 202). A computer memory is searched for a portion of the string, where the search is limited to areas of the computer memory in which are stored any instructions and/or data that together comprise the static portion of the computer software application that is instantiated as the process (step 204). If the portion of the string is absent from the searched areas of the computer memory (step 206), then one or more predefined computer-security-related remediation actions are performed (step 208), which may include any of preventing the creation of the data object, deleting or placing the data object in quarantine, and providing a computer-security-related notification reporting the activity.

The system of FIG. 1 and method of FIG. 2 may be illustrated in the context of the following exemplary scenario in which:

- an instance of a computer software application is loaded into computer memory of a computer and begins executing as a process
- the creation of a file by the process is detected
- the name of the file is determined to be "lfhlsfgh.exe"
- the areas of the computer memory that store any instructions and/or data that together comprise the static portion of the computer software application is searched for the string "lfhlsfgh"
- as the string is not found in the searched areas of the computer memory, the file "lfhlsfgh.exe" is placed in quarantine, and a notification reporting the activity as possibly malware related is provided to the user of the computer.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    detecting, by one or more processors, an activity associated with the creation of a data object, wherein the activity is performed by a process that includes static portions of a computer software application, wherein the process is an instance of the computer software application that resides in a computer memory and that is executed by a computer, and wherein the data object is configured to persist after termination of the process;
    determining, by one or more processors, a string that identifies the data object, wherein the string is generated by the process;
    determining, by one or more processors, that a portion of the string that identifies the data object does not reside in any areas of the computer memory in which are stored the static portions of the computer software application that is instantiated as the process;
    searching, by one or more processors, within any areas of the computer memory in which are stored the static portions of the computer software application that is instantiated as the process, for the portion of the string that identifies the data object, wherein the searching excludes searching within areas of the computer memory in which are stored data that are generated by the process; and
    performing, by one or more processors, a computer-security-related remediation action responsive to determining that the portion of the string that identifies the data object does not reside in any areas of the computer memory in which are stored the static portions of the computer software application that is instantiated as the process.

2. The method of claim 1, wherein the activity associated with the creation of a data object comprises creation of any of a file, a folder, and a registry key.

3. The method of claim 1, wherein the activity associated with the creation of a data object comprises an attempt by the process to create the data object.

4. The method of claim 1, wherein the detecting, by one or more processors, an activity associated with the creation of a data object, comprises detecting, by one or more processors, the data object after the data object is created.

5. The method of claim 1, wherein the computer-security-related remediation action comprises preventing the creation of the data object.

6. The method of claim 1, wherein the computer-security-related remediation action comprises deleting the data object or placing the data object in quarantine after the data object is created.

7. The method of claim 1, wherein the computer-security-related remediation action comprises providing a computer-security-related notification reporting the activity.

8. The method of claim 1, wherein the string that identifies the data object is a name.

9. The method of claim 1, wherein the searching comprises searching for multiple encodings of the portion of the string that identifies the data object.

\* \* \* \* \*